(12) United States Patent
Tsai et al.

(10) Patent No.: US 12,131,110 B2
(45) Date of Patent: *Oct. 29, 2024

(54) APPARATUS AND METHOD FOR ADVANCED MACRO CLOCK SKEWING

(71) Applicant: Taiwan Semiconductor Manufacturing Co., Ltd., Hsin-Chu (TW)

(72) Inventors: Ming-Chieh Tsai, Hsin-Chu (TW); Shao-Yu Wang, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 120 days.

This patent is subject to a terminal disclaimer.

(21) Appl. No.: 17/963,080

(22) Filed: Oct. 10, 2022

(65) Prior Publication Data

US 2023/0036554 A1 Feb. 2, 2023

Related U.S. Application Data

(63) Continuation of application No. 17/184,184, filed on Feb. 24, 2021, now Pat. No. 11,494,545.

(51) Int. Cl.
*G06F 30/396* (2020.01)
*G06F 1/10* (2006.01)
*G06F 30/392* (2020.01)

(52) U.S. Cl.
CPC .............. *G06F 30/396* (2020.01); *G06F 1/10* (2013.01); *G06F 30/392* (2020.01)

(58) Field of Classification Search
USPC ........................................................ 716/126
See application file for complete search history.

(56) References Cited

U.S. PATENT DOCUMENTS 8,629,548 B1 * 1/2014 Andreev ............ H03K 19/0016
257/691
10,776,547 B1 * 9/2020 Gupta .................. G06F 16/9024

* cited by examiner

*Primary Examiner* — Bryce M Aisaka
(74) *Attorney, Agent, or Firm* — Duane Morris LLP

(57) ABSTRACT

A method and system for generating a clock distribution circuit for each macro circuit in an ASIC design are disclosed herein. In some embodiments, a method for generating a clock distribution circuit receives the ASIC design specified in a hardware description language (HDL), places each macro circuit in allocated locations on a semiconductor substrate, generates a custom clock skew information for each macro circuit based on a macro clock delay model, generates a clock distribution circuit for each macro circuit placed on the semiconductor substrate based on the generated custom clock skew information, modifies the clock distribution circuit if the generated clock distribution circuit does not meet timing requirements of the ASIC design, and outputs a physical layout of the ASIC design for manufacturing under a semiconductor fabrication process.

20 Claims, 6 Drawing Sheets

APPARATUS AND METHOD FOR ADVANCED MACRO CLOCK SKEWING

CROSS-REFERENCE TO RELATED APPLICATION

This application is a continuation of U.S. patent application Ser. No. 17/184,184, filed Feb. 24, 2021, the contents of which is incorporated by reference herein in its entirety.

BACKGROUND

Electronic Design Automation (EDA) tools and methods are often used in the design and placement of integrated circuits on a semiconductor wafer. Generally application-specific integrated circuits (ASICs) are formed from transistors into primitive circuits that perform basic logical operations such as AND, OR, NAND, NOR, etc. These primitive circuits can then be organized into macro circuits such as multiplexers, adders, multipliers, decoders, etc., which in turn, are organized as functional blocks. In a hierarchical design of ASIC, each of the individual function is partitioned into the various macro circuits which are often predesigned and placed in a library of the EDA tools. When the individual functional designs are finalized, the overall design of the entire integrated circuit is then completed by interconnecting the individual functional blocks.

In synchronous digital systems, a clock signal serves as the time reference around which data is driven in the ASIC. The clock signal is distributed to each of the registers or latches within the functional blocks and should ideally arrive at each of the latches simultaneously during the operation of ASIC to conform to certain timing requirements to ensure proper function in the circuit. However, in practice this is not true. There are differences in the distribution of the clock which causes variation in the arrival of the clock at each of the registers or latches. This variation is referred commonly as "clock skew."

Clock distribution techniques seek to improve the clock skew of the various paths in a clock feeding network also referred as a clock tree. When clock skew is not controlled below tolerable levels, the clock signal arrives at state elements such as flip-flops at unmanageably different points in time, causing incorrect state values to become stored in state elements. Typically, the clock tree is coupled between the single clock source and, the control block latches, macro circuits or macroblocks. When the internal clock delay of each of the macro circuits is reflected in the design of the clock tree, some of the macro circuits can be connected with an intermediate stage of the clock tree.

If the clock skew falls below a skew tolerance level predetermined in a design specification, there is no clock skew issue in the overall ASIC. If the clock skew does not meet the skew tolerance specification, it should be adjusted, in order to meet the predetermined tolerance. However, when a portion of the clock tree is modified, the remaining portions thereof are also varied according thereto, thus it is actually difficult to partially correct the clock tree contained in the clock circuit. The clock tree modifications, however, result in increase of timing design iterations. Moreover, the increase of timing design iterations may prevent ASIC designs from meeting the time to market constrains.

Furthermore, in order to design the desired clock tree, an exact overall clock skew of various macro circuits should be estimated. Common current practices fail to accurately estimate the clock skew of macro circuits, which results in macro circuits being un-skewed or skewed at empirical values that may be far away from the actual clock skew values of macro circuits. In addition, existing macro circuit models do not provide information for accurate clock skew calculation. Inaccurate estimates of clock skews in macro circuits also lead to inadequate power, performance, and area (PPA) characteristics of the ASIC as well as to overall ASIC timing violations. ASIC timing violations, due to inaccurate macro circuits' clock skew estimation, translate into wasted resources expended by Automatic Place and Route tools on fixing the timing violations.

Therefore, an improved clock skewing system and method is needed to achieve optimal PPA characteristics of the ASIC chip with minimum timing design iterations.

The information disclosed in this Background section is intended only to provide context for various embodiments of the invention described below and, therefore, this Background section may include information that is not necessarily prior art information (i.e., information that is already known to a person of ordinary skill in the art). Thus, work of the presently named inventors, to the extent the work is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
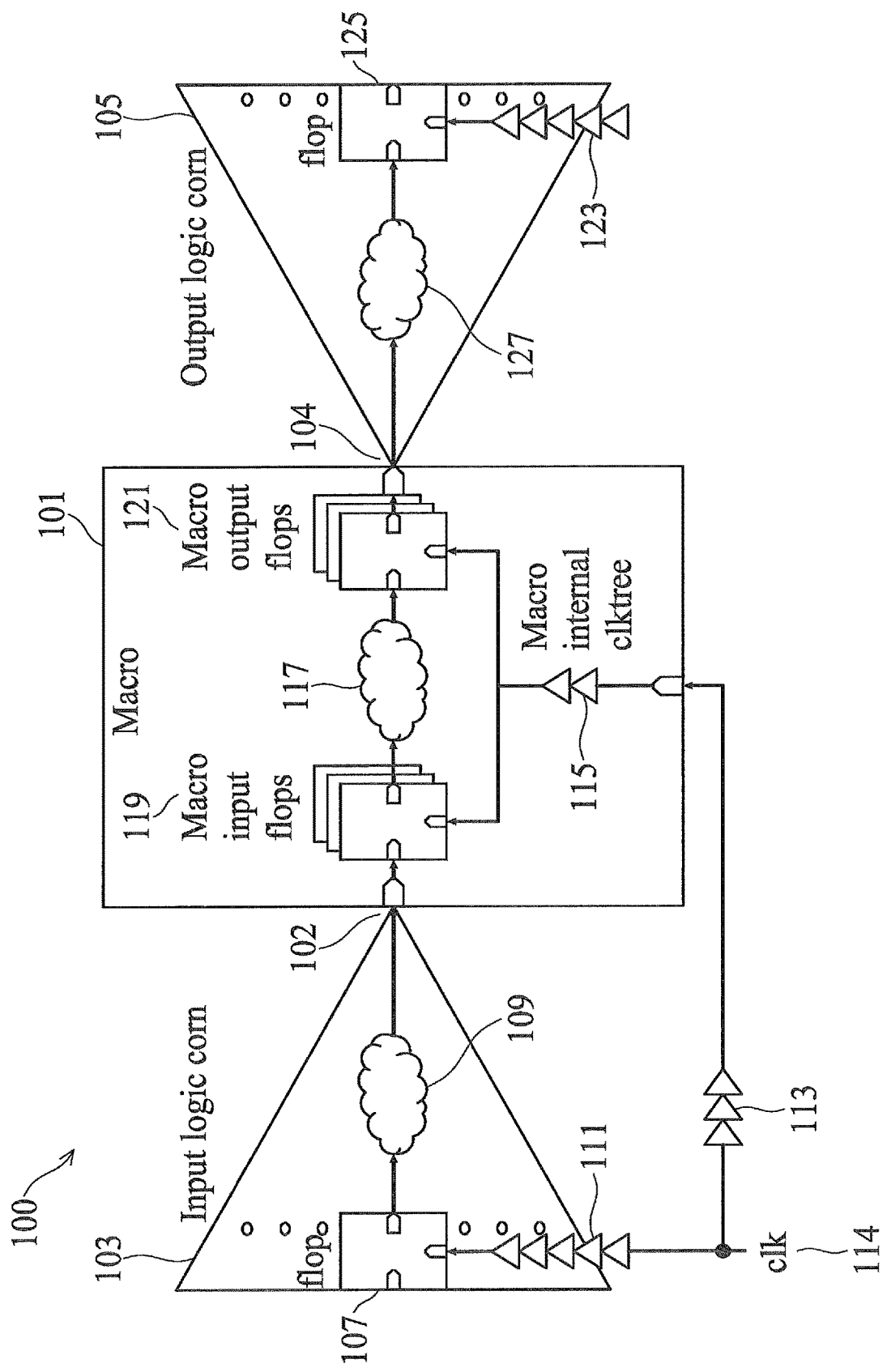
FIG. 1 illustrates a schematic diagram of a clock tree included in a synchronous ASIC, in accordance with some embodiments.

As illustrated in FIG. 1, a synchronous ASIC 100 includes a macro circuit 101 that may be selected from a library of cells. In some embodiments, the macro circuit 101 may be configured to perform a logical or arithmetic function. The library of cells may also include other functional macro circuits such as barrel shifter or random access memory (RAM). In various embodiments, the layout of macro circuit 101 is predetermined in the library of cells. The macro circuit 101 may include input flip-flops 119 that are configured to receive input signals from an input logic 103. Moreover, the macro circuit 101 may also comprise output flip-flops 121 that are configured to transmit output signals to an output logic 105. In some embodiments, the input and output flip-flops 119 and 121 may be implemented, in one example, as a D-type flip-flop circuit. However, other types of flip-flops may be implemented to meet the design criteria of a particular application. The macro circuit 101 may further include a combinational circuit 117 configured to perform a desired function. Furthermore, the macro circuit 101 may include an internal clock tree 115 coupled to each input and output flip-flops 119 and 121. Since the internal layout of the macro circuit 101 is fixed, the clock delays affected by capacitances and resistances of the geometrical structure and/or relationship between cells or metal wires within the macro circuit 101 may not be adjusted during the ASIC design process.

In some embodiments, the input logic 103 is coupled to an input terminal 102 of the macro circuit 101 and further includes an input flip-flop 107 configured to receive input signals. In various embodiments, the input logic 103 may include an input preprocessing combinational logic 109 connected between an output of the input flip-flop 107 and the input terminal 102 of the macro circuit 101. In some embodiments, the input flip-flop 107 may be clocked by an external clock signal generator 114 that is connected to a root of an external clock tree having a brunch 111 that distributes the clock signal from the clock signal generator 114 to the input flip-flop 107 and any other clocked element in the input logic 103. In some embodiments, the clock tree may include clock tree brunches 113 and 123. In particular, the clock tree brunch 113 may be configured to distribute the clock signal to the macro circuit 101. The clock brunch 123 may distribute the clock signal to an output logic 105. In some embodiments, the clock tree includes a set of buffers and/or inverters for providing the power needed to fan out the clock signal at the clock tree's brunch nodes. Moreover, additional buffers may be inserted into various brunches of clock tree to adjust the path delays so that clock signal edges arrive at the input logic 103, the macro circuit 101, and the output logic 105 at the same time. Although for simplicity the clock tree depicted in FIG. 1 only has three brunching levels, clock trees frequently have many more brunching levels and can supply clock signals to other circuit modules.

In other embodiments, the output logic 105 may be coupled to an output terminal 104 of the macro circuit 101. In fact, the output logic 105 may further include an output flip-flop 125 configured to provide output signals. In various embodiments, the output logic 105 may include an output preprocessing combinational logic 127 connected between the output 104 of the macro circuit 101 and the output flip-flop 125. In some embodiments, the output flip-flop 125 may be clocked by the external clock signal generator 114 through clock tree brunch 123.

Figure 2:
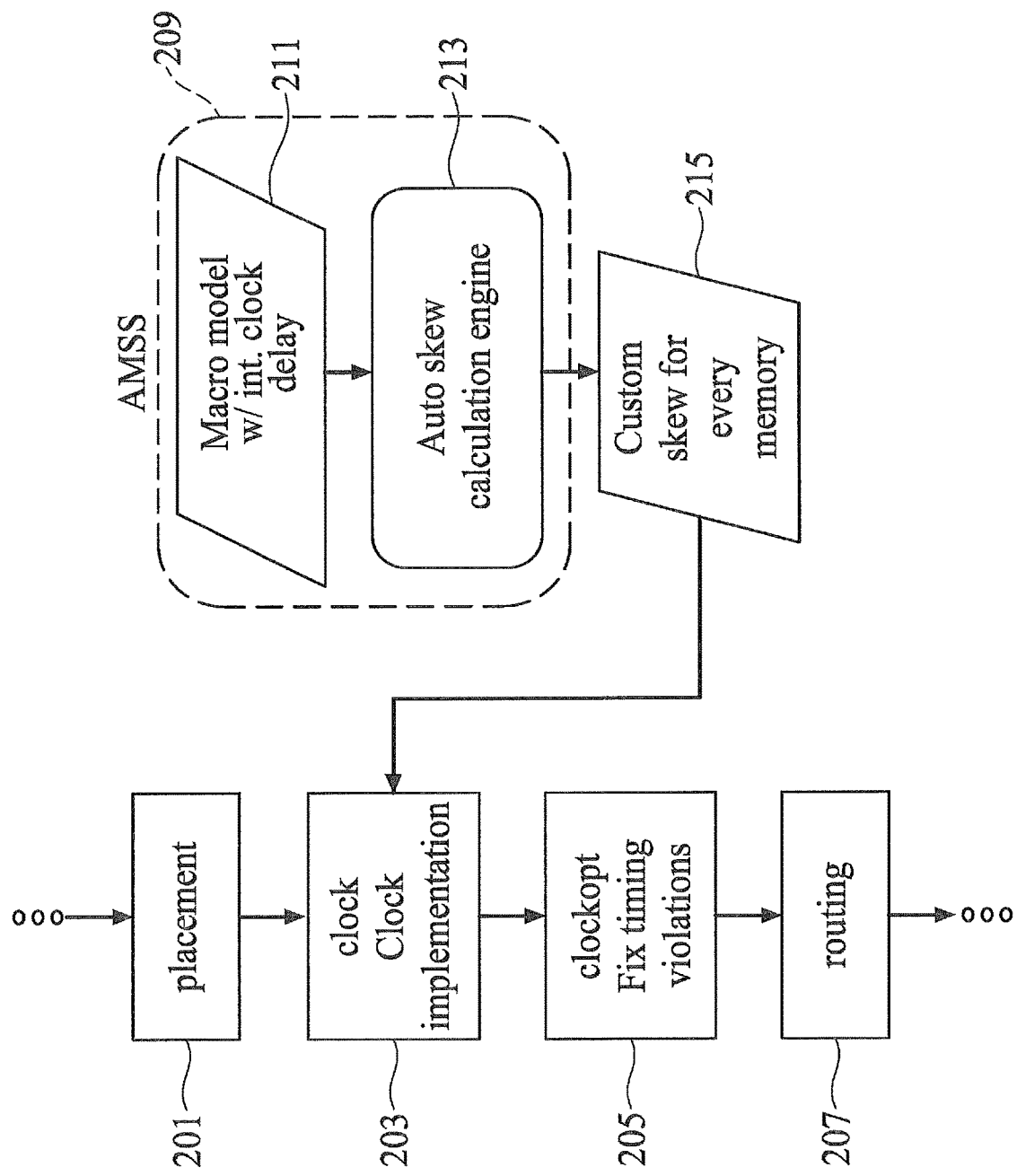
FIG. 2 is a flow diagram of an exemplary automatic place and route design flow with a macro skewing engine, in accordance with some embodiments.

FIG. 2 is a diagram of an automatic place and route design flow with a macro skewing engine 209, in accordance with some embodiments. As shown in FIG. 2, the automatic placing and routing of a design start with an initial placement 201 based on an input netlist. In some embodiments, a synthesis tool generates the input netlist representing the design from the input design specifications set forth in an HDL, for example. After macro circuits specified in the input netlist are placed in their allocated locations on the substrate, the automatic place and route flow generates a clock distribution circuit or a clock tree 203 for each of the macro circuits in the ASIC design. In some embodiments, the clock tree generation 203 is based on a custom clock skew information 215 for each macro circuit in the ASIC design. Moreover, the custom clock skew information 215 is determined by an automatic macro skewing strategy (AMSS) unit 209. The AMSS unit 209 is described in more detail below.

After the clock tree generation 203, delay blocks for each clock tree brunch are modified at clock tree timing violation step 205 based on the custom clock skew information 215 to compensate for and thus eliminate clock skew for each brunch of the clock tree. The automatic place and route design flow then completes the placement, wiring, and checking of the design at routing step 205 to complete the integrated circuit for manufacturing.

In some embodiments, the AMSS unit 209 comprises a macro internal clock delay model 211 and an automatic clock skew calculation module 213. In some embodiments, the automatic clock skew calculation module 213 determines the clock skew information 215 for every macro circuit based on the macro internal clock delay model 211. In further embodiments, the macro internal clock delay model 211 includes clock insertion delays from the root of the internal macro clock tree to every I/O flip-flop (e.g., flops 119 or 121). In an alternative embodiment, the macro internal clock delay model 211 may include clock insertion delays from the root of the internal macro clock tree to a group of input flip-flops or a group of output flip-flops. Yet in another embodiment, the macro internal clock delay model 211 may include an average clock insertion delay to all I/O flip-flops.

In some embodiments, the clock insertion delay model is based on extracting the parasitic circuit elements that affect the internal clock skew of the macro circuits. The resistance and capacitance (RC) extraction, also called as parasitic extraction extracts electrical characteristics of the layout of the macro circuits in order to determine the internal clock skews of the macro circuits. In some embodiments, RC extraction tools such as StarRC may be used to extract the RC network of the macro circuits, which then may be used to construct the macro internal clock delay model 211. In various embodiments, timing analysis tools such as Spice or Primetime may be used to determine the clock insertion delays from the root of the internal macro clock tree to every I/O flip-flop based on the extracted RC network. Furthermore, the macro internal clock delay model 211 may be saved in the Liberty timing format. In other embodiments, the macro internal clock delay model 211 can be saved in any other timing formats. In some embodiments, the internal clock delay model 211 may include an average clock delay from the root of the internal macro clock tree to every I/O flip-flop. In some embodiments, the Liberty timing format may include a one-dimensional table of clock delays from the root of the internal macro clock tree to every I/O flip-flop.

Figure 3:
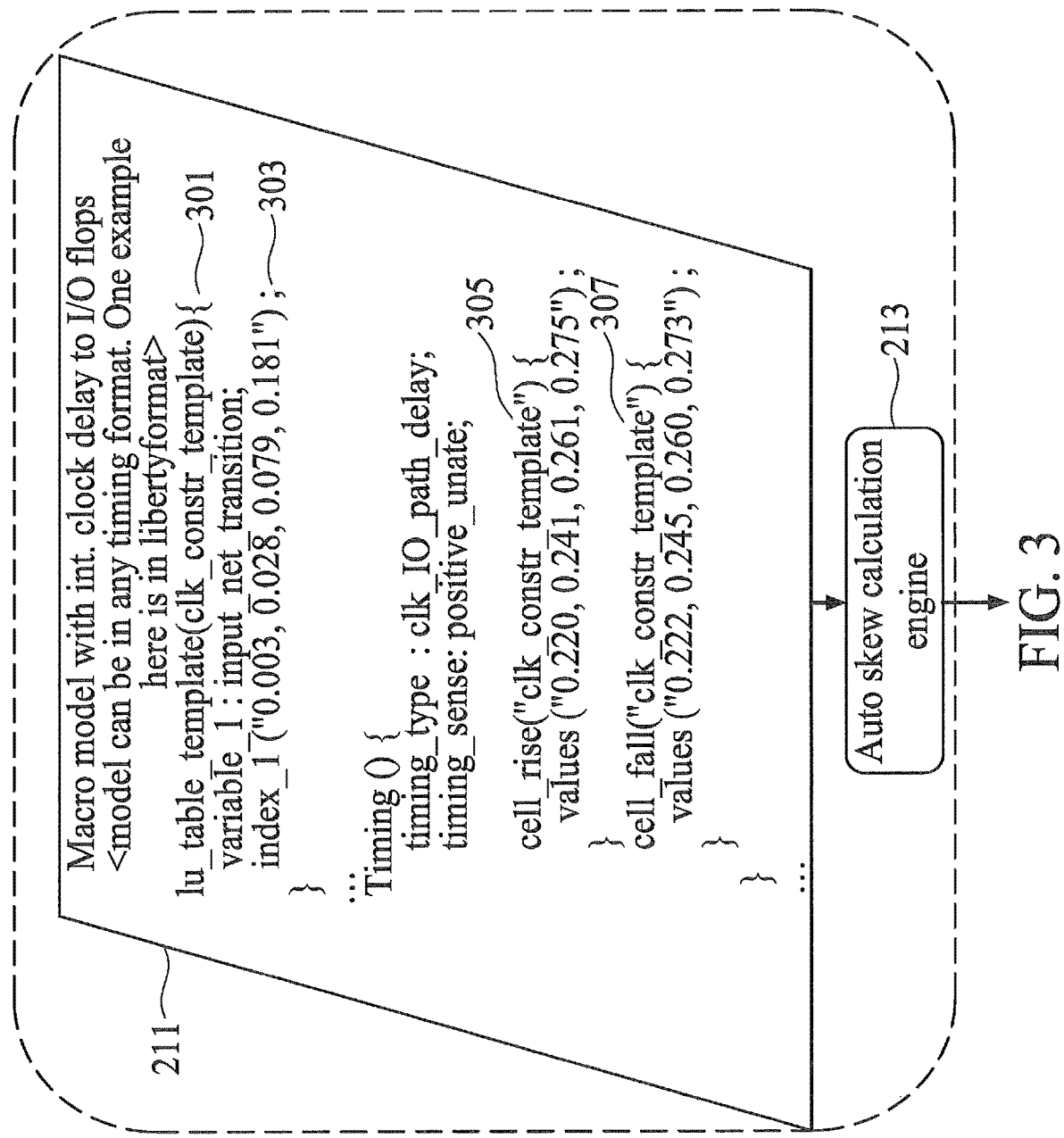
FIG. 3 illustrates a diagram of a macro clock delay model, in accordance with some embodiments.

FIG. 3 illustrates a diagram of the macro clock delay model 211 in Liberty format, in accordance with some embodiments. As such, the Liberty format may store a common lookup table 303 that specifies the breakpoints of rising or falling transition delays at the clock port of the macro circuit 101. In some embodiment, the rising or falling transition delays specify the time it takes for the clock signal at the clock port of the macro circuit 101 to change its state from one logic level to another. In some embodiments, the common lookup table 303 can be labeled with a unique label 301.

In some embodiments, the macro clock delay model 211 may include the macro internal clock delays from the root of the internal macro clock tree to every I/O flip-flop for rising and falling outputs. As such, macro circuit's internal clock delays for rising outputs may be specified in a rising table 305 and macro circuit's internal clock delays for falling outputs may be specified in a falling table 307. In various embodiments, the internal clock delays specified in the rising and falling tables 305 and 307 may specify the clock delay values for every I/O flip-flops, for groups of I/O flip-flops, or one single value such as average delay for all I/O flip-flops.

In some embodiments, the index of the clock transition value in the common lookup table 303 specifies the index into the rising or falling tables 305 and 307 that specify internal macro clock tree delay. For example, if the clock transition value is 0.028 ns (index(0.028)=2) and a rising output is considered, the internal clock delay will be 0.241 ns (index(0.241)=2). In some embodiments, the automatic clock skew calculation module 213 determines the clock skew information 215 for each macro circuit based on the macro internal clock delay model 211 stored Liberty format.

Figure 4:
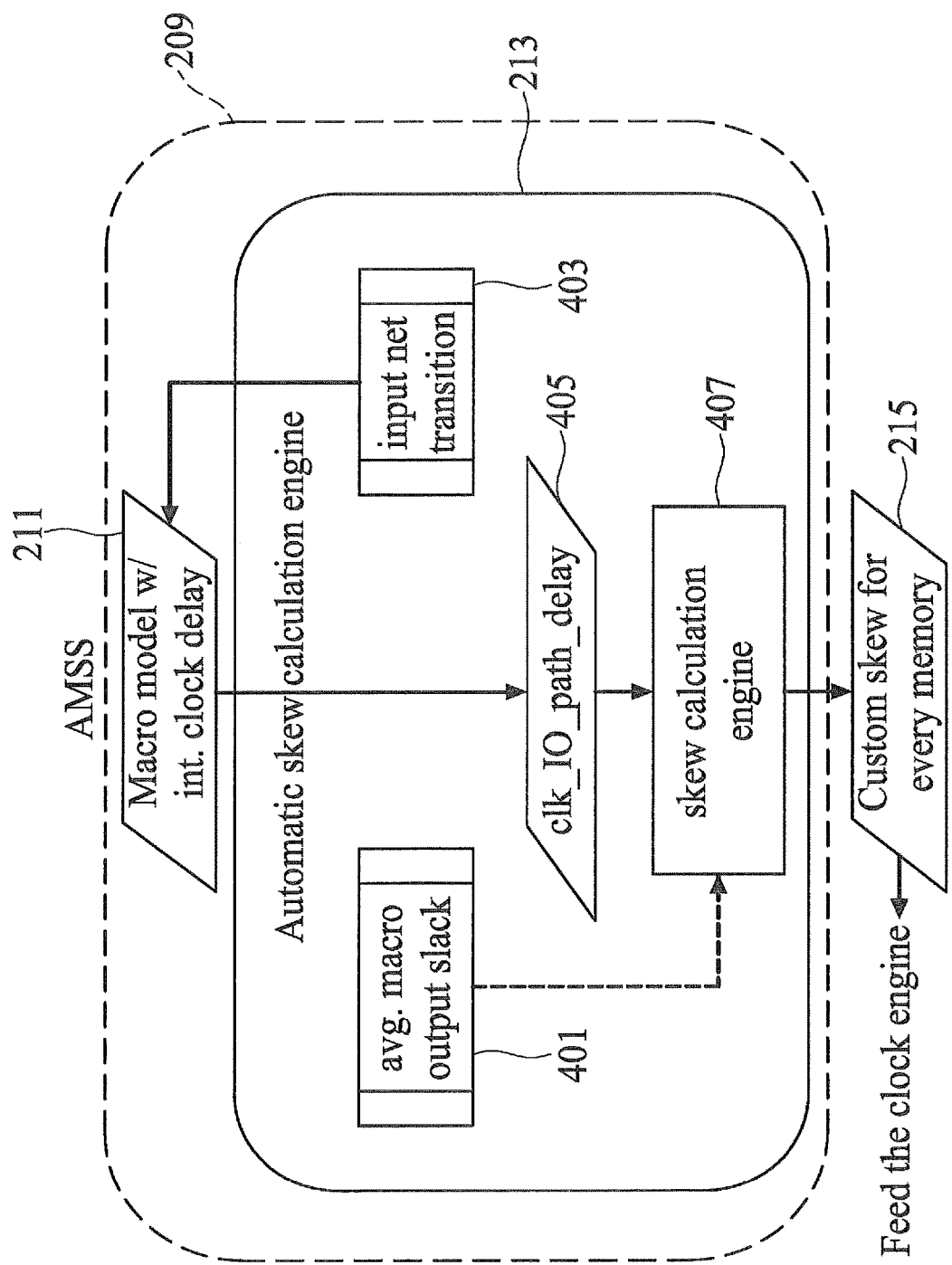
FIG. 4 illustrates a schematic diagram of a macro clock skew calculation module, in accordance with some embodiments.

FIG. 4 illustrates the schematic diagram of the macro clock skew calculation module 213, in accordance with some embodiments. In some embodiments, the macro clock skew calculation engine determines the internal clock skew based on the macro clock delay model 211 and outputs a custom clock skew for every I/O flip-flop or a group of I/O flip-flops of the macro 101. In some embodiments, the macro clock skew calculation module 213 receives information stored in the macro clock delay model 211, which is utilized to extract a clock delay(s) 405 from the root of the internal macro clock tree to an I/O flip-flop or a group of I/O flip-flops. In various embodiments, the macro clock skew calculation module 213 also stores an input net transition database 403 that specifies clock transition delays of each macro circuit in the ASIC design. In further embodiments, the clock delay(s) 405 is determined based on the low to high or high to low clock transition delays stored in the database 403. In further embodiments, the automatic place and route tool may provide the low to high or high to low clock transition delays based on physical placement and routing of macro circuits in the ASIC design.

In some embodiment, the skew calculation module 213 may include a custom skew calculation engine 407. Since for each macro circuit in the ASIC design clock transition delay(s) and input and output loads are different, the custom skew calculation engine 407 may be configured to receive clock transition delays 403 and the clock to I/O flip-flop delay(s) 405 for each macro circuit in the ASIC design and provide a custom clock skew for every clock to I/O flip-flop for each macro circuit in the ASIC. In some embodiments, the custom skew calculation engine 407 calculates the clock to I/O flip-flops skew based on the macro internal clock delay model 211 and clock transition delays 403 for each I/O flip-flop or a group of I/O flip-flops in the macro circuit. Moreover, the custom skew calculation engine 407 may also check whether the clock to I/O flip-flop skews satisfy the timing constraints of the ASIC design. Furthermore, the skew calculation engine provides the actual the clock to I/O flip-flop skews based on physical layout of the macro. In some embodiments, the skew calculation module 213 may include an average output setup slack (a margin by which the timing constraint is met or not met) 401 that specifies an average macro output setup slack of all output flip-flops. In some embodiments, the average macro output setup slack may be determined during the placement stage 201 of the automatic placing and routing of a design.

In some embodiments, the custom skew calculation engine 407 determines custom clock to I/O flip-flop skews for each macro as a maximum of the macro internal clock delay to its I/O flip-flop(s) 405 and the difference of the macro internal clock delay and the average output setup slack 401 as follows:

$$\text{Skew} = \max(OS_{macro_{ID}}, (OS_{macro_{ID}} - \text{macro}_{SLK})),$$

where $OS_{macro_{ID}}$ is the internal clock delay to its I/O flop(s) 405 specified in the lookup tables 305 or 307 of internal clock delay model 211 and $\text{macro}_{SLK}$ is the average output slack 401. As such, the skew provided by the skew calculation engine 407 is at least $OS_{macro_{ID}}$, the clock insertion delay to macro circuit's I/O flip-flop(s). In some embodiments, the custom skew calculation engine 407 may be applied to every macro circuit in the ASIC design to generate a set of customized clock to I/O flip-flop skews. For example, if the macro circuit has five output ports and the automatic place and route tool provides the following output setup slacks: −0.15, 0.26, 0.28, 0.30, and 0.15, the average arithmetic output setup slack can be calculated to be 0.168. Moreover, if the automatic place and route tool provide that the macro clock transition delay is 0.054, the index of 0.054 in the common lookup table 303 is 3, which can be used to determine the clock to I/O delay 405 from the lookup table 305 to be 0.261. Thus, the skew can be determined to be:

$$\text{Skew} = \max(0.261, (0.261 - 0.168)) = 0.261$$

One exemplary advantage of determining the custom clock to I/O flip-flop skews is that it provides for shorter design cycles and an optimal PPA. Moreover, optimal PPA achieved from determining the custom clock to I/O flip-flop skews for each macro circuit also improves the yield and enables ASIC designers to incorporate more features into the ASIC design.

Figure 5:
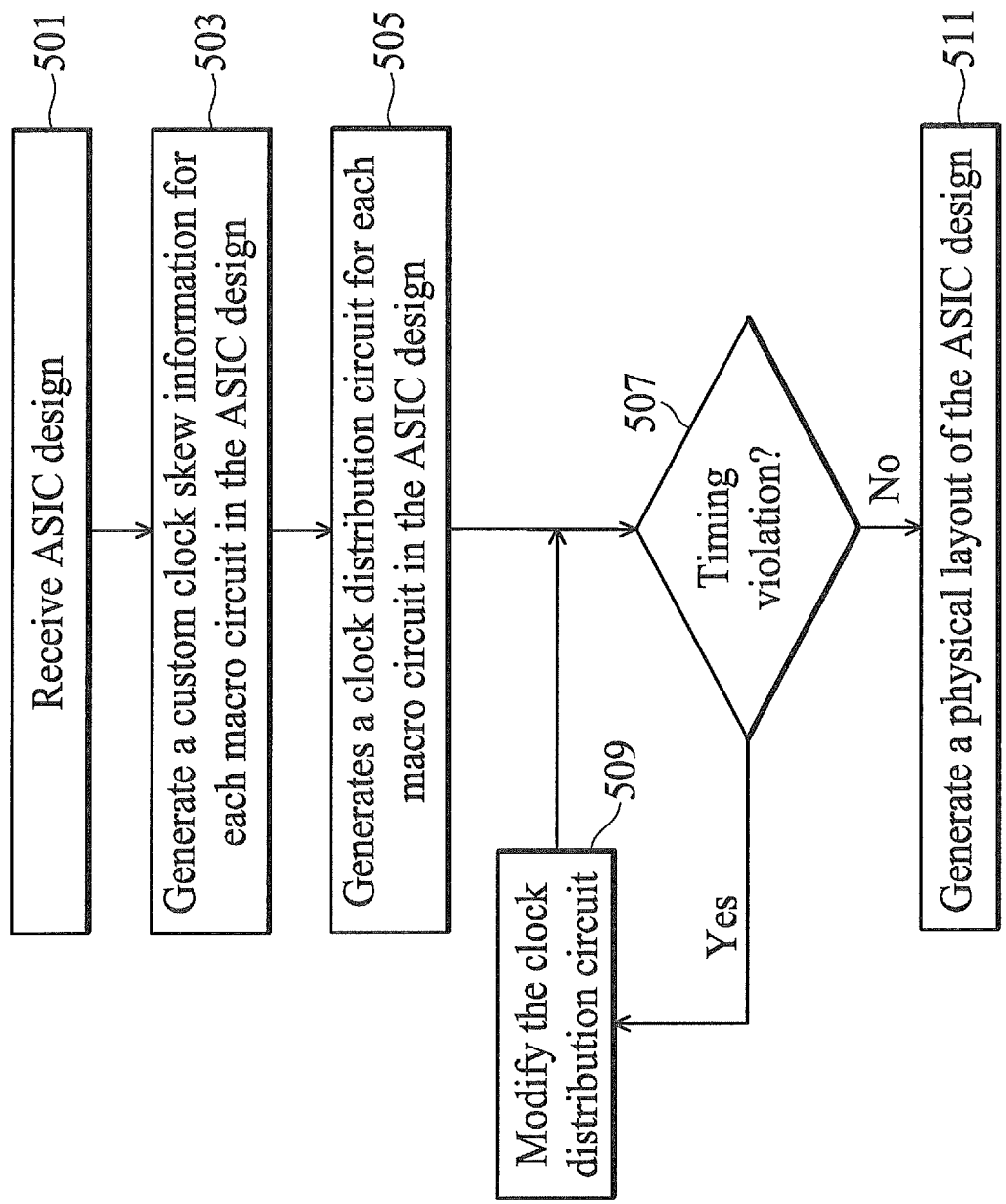
FIG. 5 illustrates a flow diagram of a method for determining macro clock skew based on the macro clock delay model, in accordance with some embodiments.

FIG. 5 illustrates a flow diagram of a method for determining macro clock skew based on the macro clock delay model, in accordance with some embodiments. At operation 501, a source gate-level netlist describing the existing ASIC design may be received. In some embodiments, the gate-level netlist may be a text file synthesized from a Register Transfer Level (RTL) source code by an RTL Compiler synthesis tool. In further embodiments, the source gate-level netlist may comprise a hierarchical or flattened gate level netlist representing the ASIC design. Moreover, the source gate-level netlist may include component(s) and a description of their interconnections using nets. Furthermore, the components source gate-level netlist can be reduced to combinatorial or sequential logic gates, or they may be hierarchical blocks of lower level. In some embodiments, the source gate-level netlist may be parsed into a data structure such as a directed graph with graph's vertices serving as parsed standard cells and directed edges as inputs and outputs of the parsed standard cells.

At operation 503, a custom clock skew information for each macro circuit in the ASIC design is generated based on the macro clock delay model 211 stored in Liberty format. In accordance with some embodiments, the stored macro clock delay model 211 may be based on resistance and capacitance (RC) extraction.

At operation 505, after the automatic placing and routing the macros of the received ASIC design in the allocated locations of the semiconductor substrate, a custom clock distribution circuit for each placed macro circuit is generated. In some embodiments, the generation of the clock distribution circuit is based the custom clock skew information generated for each macro circuit of the ASIC design.

At operation 507, after the clock distribution circuit is generated, timing requirements to ensure proper function in the ASIC circuit are checked. If there are timing violations for the ASIC design, the clock distribution circuit may be modified at operation 509 to compensate for and thus eliminate clock skew for each brunch of the clock distribution tree.

At operation 511, a physical layout of the received ASIC design which then can be used to complete and manufacture the ASIC using a semiconductor fabrication process is generated. The physical layout, often referred to as "geometry," may be used to generate the integrated circuit tooling, which is a series of masks, each representing a layer for the ASIC circuit. The tooling is then used by manufacturers to fabricate an integrated circuit.

At operation 513, the ASIC may be fabricated according to the physical layout of the ASIC design by a semiconductor fabrication system. In particular, the ASIC may be fabricated on a semiconductor wafer comprising a plurality of dies. In some embodiments, the semiconductor fabrication system configured to fabricate the ASIC according to the received physical layout may include without limitation metrology subsystems, deposition subsystems, lithography subsystems, etching subsystems, coating subsystems, buffering subsystems, storage subsystem, inspection subsystems, heating/cooling subsystems, and so forth.

Figure 6:
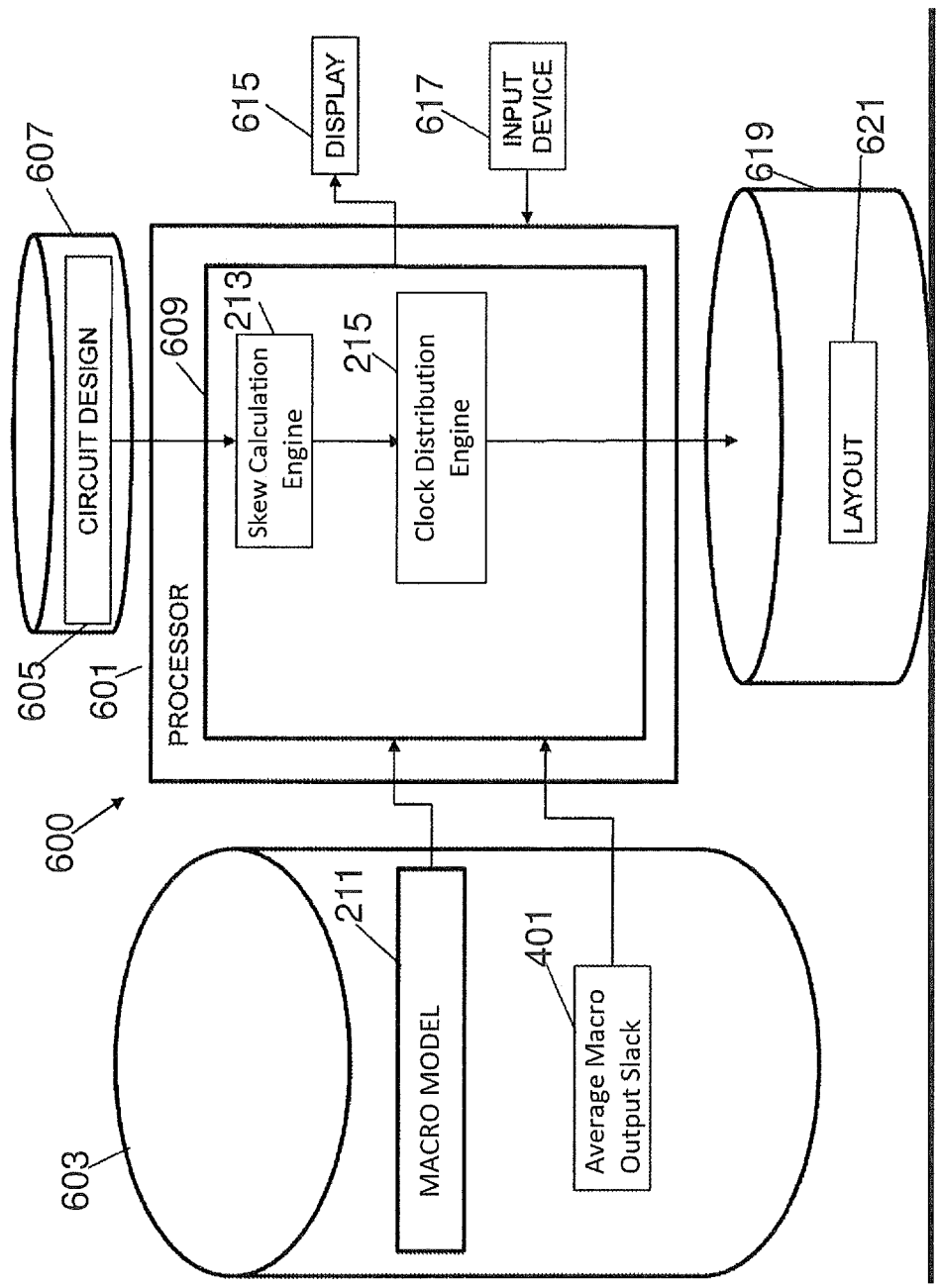
FIG. 6 is a block diagram of an EDA tool for performing the method, in accordance with some embodiments.

FIG. 6 shows an EDA tool 600 comprising a system for determining macro clock skew based on the macro clock delay model 609, in accordance with some embodiments. FIG. 6 is not intended as a complete detailed block diagram of all of the capabilities of EDA tools. For example, the EDA tool 600 may also include a combination of the following modules: logic synthesis, behavioral synthesis, place and route, static timing analysis, formal verification, HDL (SystemC, Systemverilog/Verilog, VHDL) simulators as well as transistor-level circuit simulation. Such modules may be implemented in one or more processors (i.e., at least one processor) configured to execute computer-executable instructions and related data stored in one or more storage modules or memories coupled to the at least one processor.

As shown in FIG. 6, the EDA tool 600 may include the macro clock skew calculation module 213, and a plurality of modules configured to transform between a gate-level description of the ASIC design and the GDS II layout (transistor level) description (or other suitable layout description format). In some embodiments, EDA tool 600, may running on at least one processor 601 which may be, for example, a general purpose computer or embedded processor configured by programming with special purpose computer program instructions, the macro internal clock delay model 211, and the average output setup slack 401 stored in a persistent machine readable storage medium 603. In some embodiment, the storage medium 603 also includes a plurality of design rules, which include parameters that are specific to a particular semiconductor fabrication process. The design rules may incorporate parameters that are used by the semiconductor fabrication system. In some embodiments, the system for determining macro clock skew based on the macro clock delay model 609 include the automatic clock skew calculation module 213 and the custom clock skew information engine 215 for compensating and eliminate clock skew for each brunch of the clock tree as described with reference to FIG. 2 or FIG. 4.

The EDA tool 600 comprising the system for determining macro clock skew based on the macro clock delay model may include an additional machine readable medium 607 for storing the ASIC gate level netlist 605, and an a medium 619 for storing the physical layout (e.g., GDS II data) 621 of the ASIC design described in the gate level netlist 605. In some embodiments, all of the data 607, 211, 401, and 621 may be stored on the same medium. In further embodiments, the EDA tool 600 may be connected to a display device 615 that is configured to display the graphical user interface (GUI) of the EDA tool. In some embodiments, the EDA tool 600 may also be connected to an input device 617 that is configured to receive user inputs.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the broadest scope consistent with the novel features and principles disclosed herein.

What is claimed is:

1. A method for generating a clock distribution circuit for each macro circuit in an application specific integrated circuit (ASIC) design comprising:
   receiving the ASIC design specified in a hardware description language (HDL);
   placing each macro circuit in allocated locations on a semiconductor substrate;
   generating a custom clock skew information for each macro circuit based on a macro clock delay model, wherein generating the custom clock skew information further comprises performing a table lookup into one-dimensional tables of clock delays based on an index determined by breakpoints of transition delays of a clock signal at a clock terminal of each macro circuit;
   generating a clock distribution circuit for each macro circuit placed on the semiconductor substrate based on the generated custom clock skew information;
   modifying the clock distribution circuit if the generated clock distribution circuit does not meet timing requirements of the ASIC design; and
   outputting a physical layout of the ASIC design for manufacturing under a semiconductor fabrication process.

2. The method of claim 1, wherein the macro clock delay model is a text file in Liberty format comprising the one-dimensional tables of clock delays specifying a clock delay from a root of an internal macro clock tree to each input/output state element.

3. The method of claim 1, wherein generating the custom clock skew information for an output state element of the macro circuit further comprises determining a maximum of a clock delay from a root of an internal macro clock tree to the output state element and a difference between the clock delay and an average output setup slack of all output state elements of the macro circuit.

4. The method of claim 1, wherein determining the index further comprises:
   performing a table lookup into a common lookup table specifying transition delays of the clock signal at the clock terminal of each macro circuit and extracting the index of a breakpoint closest to a transition delay provided by an automatic place and route tool.

5. The method of claim 1, further comprising generating the macro clock delay model by extracting parasitic circuit elements of each macro circuit using resistance and capacitance (RC) extraction tools.

6. A non-transitory machine-readable medium storing instructions that when executed by a processor performs a method for generating a clock distribution circuit for each macro circuit in an application specific integrated circuit (ASIC) design, the method comprising:
   receiving the ASIC design specified in a hardware description language (HDL);
   placing each macro circuit in allocated locations on a semiconductor substrate;
   generating a custom clock skew information for each macro circuit based on a macro clock delay model, wherein generating the custom clock skew information further comprises performing a table lookup into one-dimensional tables of clock delays based on an index determined by breakpoints of transition delays of a clock signal at a clock terminal of each macro circuit;

generating a clock distribution circuit for each macro circuit placed on the semiconductor substrate based on the generated custom clock skew information;

modifying the clock distribution circuit if the generated clock distribution circuit does not meet timing requirements of the ASIC design; and outputting a physical layout of the ASIC design for manufacturing under a semiconductor fabrication process.

7. The non-transitory machine-readable medium of claim 6, wherein the macro clock delay model is a text file in Liberty format comprising the one-dimensional tables of clock delays specifying a clock delay from a root of an internal macro clock tree to each input/output state element.

8. The non-transitory machine-readable medium of claim 6, wherein generating the custom clock skew information for an output state element of the macro circuit further comprises determining a maximum of a clock delay from a root of an internal macro clock tree to the output state element and a difference between the clock delay and an average output setup slack of all output state elements of the macro circuit.

9. The non-transitory machine-readable medium of claim 6, wherein determining the index further comprises:

performing a table lookup into a common lookup table specifying transition delays of the clock signal at the clock terminal of each macro circuit and extracting the index of a breakpoint closest to a transition delay provided by an automatic place and route tool.

10. The non-transitory machine-readable medium of claim 6, wherein the macro clock delay model is based on a resistance and capacitance (RC) extraction.

11. The non-transitory machine-readable medium of claim 6, wherein the method further comprises:

generating the macro clock delay model by extracting parasitic circuit elements of each macro circuit using RC extraction tools.

12. An integrated circuit design system comprising:

a computer having a processor and memory;

a software application, run by the computer processor, and residing in the computer memory;

the software application comprising a plurality of software function modules comprising:

a place and route module configured to receive an application specific integrated circuit (ASIC) design specified in a hardware description language (HDL) and to place each macro circuit of the received ASIC design in allocated locations on a semiconductor substrate;

a skew determination module having a clock skew calculation engine coupled to a macro clock delay model and configured to:

generate a custom clock skew information for each macro circuit based on the macro clock delay model;

generate a clock distribution circuit for each macro circuit placed on the semiconductor substrate based on the generated custom clock skew information;

perform a table lookup into one-dimensional tables of clock delays based on an index determined by breakpoints of transition delays of a clock signal at a clock terminal of each macro circuit;

a clock distribution modification module configured to modify the clock distribution circuit if the generated clock distribution circuit does not meet timing requirements of the ASIC design; and routing module configured to outputting a physical layout of the ASIC design for manufacturing under a semiconductor fabrication process.

13. The integrated circuit design system of claim 12, wherein the macro clock delay model is a text file in Liberty format comprising the one-dimensional tables of clock delays specifying a clock delay from a root of an internal macro clock tree to each input/output state element.

14. The integrated circuit design system of claim 12, wherein the skew determination module is further configured to determine the clock skew information for an output state element of the macro circuit by determining a maximum of a clock delay from a root of an internal macro clock tree to the output state element and a difference between the clock delay and an average output setup slack of all output state elements of the macro circuit.

15. The integrated circuit design system of claim 12, wherein the macro clock delay model further comprises a common lookup table specifying transition delays of the clock signal at the clock terminal of each macro circuit and one-dimensional tables of clock delays.

16. The integrated circuit design system of claim 15, wherein the one-dimensional tables of clock delays are formed on extracted parasitic circuit elements of each macro circuit using RC extraction tools.

17. The integrated circuit design system of claim 12, wherein the macro clock delay model is based on a resistance and capacitance (RC) extraction.

18. The integrated circuit design system of claim 17, wherein the place and route module is further configured to determine the average output setup for each macro circuit in the ASIC design.

19. The integrated circuit design system of claim 12, wherein the skew determination module further comprises an input net transition database configured to specify clock transition delays of each macro circuit in the ASIC design.

20. The integrated circuit design system of claim 19, wherein the place and route module is further configured to provide the clock transition delays based on physical placement and routing of each macro circuit of the ASIC design.

* * * * *